(12) United States Patent
Fan

(10) Patent No.: US 8,191,839 B2
(45) Date of Patent: Jun. 5, 2012

(54) ENHANCED STRUCTURE FOR SUCTION APPARATUS

(76) Inventor: Eagle Fan, Hsinchu (TW)

( * ) Notice: Subject to any disclaimer, the term of this patent is extended or adjusted under 35 U.S.C. 154(b) by 227 days.

(21) Appl. No.: 12/793,678

(22) Filed: Jun. 4, 2010

(65) Prior Publication Data

US 2011/0297804 A1    Dec. 8, 2011

(51) Int. Cl.
*A45D 42/14* (2006.01)

(52) U.S. Cl. .................................. 248/205.5; 248/206.2

(58) Field of Classification Search ............... 248/205.7, 248/683, 467, 205.5, 206.2, 309.3, 363; 269/21; 206/829
See application file for complete search history.

(56) References Cited

U.S. PATENT DOCUMENTS

| 7,021,593 | B1 * | 4/2006 | Fan | 248/206.2 |
| 7,661,638 | B2 * | 2/2010 | Yu | 248/205.8 |
| 7,735,791 | B2 * | 6/2010 | Bury | 248/205.5 |
| 7,793,899 | B2 * | 9/2010 | Fan | 248/206.2 |
| 8,091,843 | B2 * | 1/2012 | Tsai | 248/206.2 |
| 2007/0120026 | A1 * | 5/2007 | Chen | 248/205.5 |
| 2007/0278371 | A1 * | 12/2007 | Wang | 248/309.3 |
| 2009/0127411 | A1 * | 5/2009 | Aguilar | 248/205.8 |

* cited by examiner

*Primary Examiner* — A. Joseph Wujciak, III
(74) *Attorney, Agent, or Firm* — Lin & Associates IP, Inc.

(57) ABSTRACT

A suction apparatus is provided, including a suction disc unit, a shell base unit, a push obstruct unit and a flip unit. The top surface of the suction disc unit includes an upward extending traction element, with vertical surfaces forming a first teeth surface and a second teeth surface. The shell base unit is located on top of the suction disc unit. The push obstruct unit and the flip unit are located inside the shell base unit, where the flip unit is meshed with the first teeth surface and the push obstruct unit is meshed with the second teeth surface. When the flip unit is flipped downwards, the central area of the suction disc unit is dragged up so that the suction disc unit can attach to a surface via suction force. When the flip element is flipped upwards, the obstructing condition of the push obstruct unit is released so that the suction disc unit restores to a normal position.

8 Claims, 9 Drawing Sheets

ENHANCED STRUCTURE FOR SUCTION APPARATUS

FIELD OF THE INVENTION

The present invention generally relates to a suction apparatus, when suction to attach, the rack using mesh manner and linked movement to control the raising of suction disc. The feature of the present invention is for the suction apparatus to attach or release by flipping a single element.

BACKGROUND OF THE INVENTION

The inventor designed a vacuum suction apparatus, patented as U.S. Pat. No. 7,021,593. The suction apparatus includes a suction disc, a base, a linked element and a hook structure. The top of the suction disc forms a protruding rack. The outer wall at one end of the linked element forms a teeth part for meshing with the rack of the suction disc. The linked element is only for pulling the rack so that the central area of the suction disc will rise. The hooking structure is for temporarily fastening the position of the linked element after flipping so that the suction disc will maintain good suction to attach. To operate the suction apparatus, the suction to attach can be performed by pressing the linked element; however, to release the suction disc, other elements of the hooking structure must be triggered to release the linked element from fastened position. Hence, the user must trigger two different elements on the suction apparatus to attach and release the suction apparatus from a surface. This may cause minor inconvenience In use. Therefore, the inventor researched and an enhanced structure of a more convenient suction apparatus is devised.

SUMMARY OF THE INVENTION

The primary object of the present invention is to provide a suction apparatus with rack mesh linked movement mechanism a single element flipping mechanism to attach or release.

To achieve the above object, the present invention provides a suction apparatus, including a suction disc unit, a shell base unit, a push obstruct unit, and a flip unit. The suction disc unit includes a suction disc and traction element. The traction element is connected to the top surface of the suction disc. The shell base unit includes a disc body and a support base. The support base is located on the top surface of the disc body. The inside of the support base forms a guide channel through the disc body. The traction element is partially guided by the guide channel to enter the support base. The vertical surface of the traction element forms a first teeth surface and a second teeth surface. The push obstruct unit is located inside the support base. In normal condition, the push obstruct unit is meshed with the second teeth surface of the traction element. The flip unit is coupled to the shell base, and is made up of a link element and a flip element coaxially. The link element forms a teeth part on the surface facing the edge outer wall of the traction element. The teeth part is meshed with the first teeth surface. The flip element is located above the link element, and can operate the linked movement with the push obstruct unit properly. When the flip element is pressed downwards, the link element will rotate along because the teeth part is meshed with the first teeth surface so that the traction element will also move in a linked manner. When the flip element is flipped upwards, the flip element will push the press obstruct element to release the mesh engagement between the press obstruct element and the second teeth surface.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
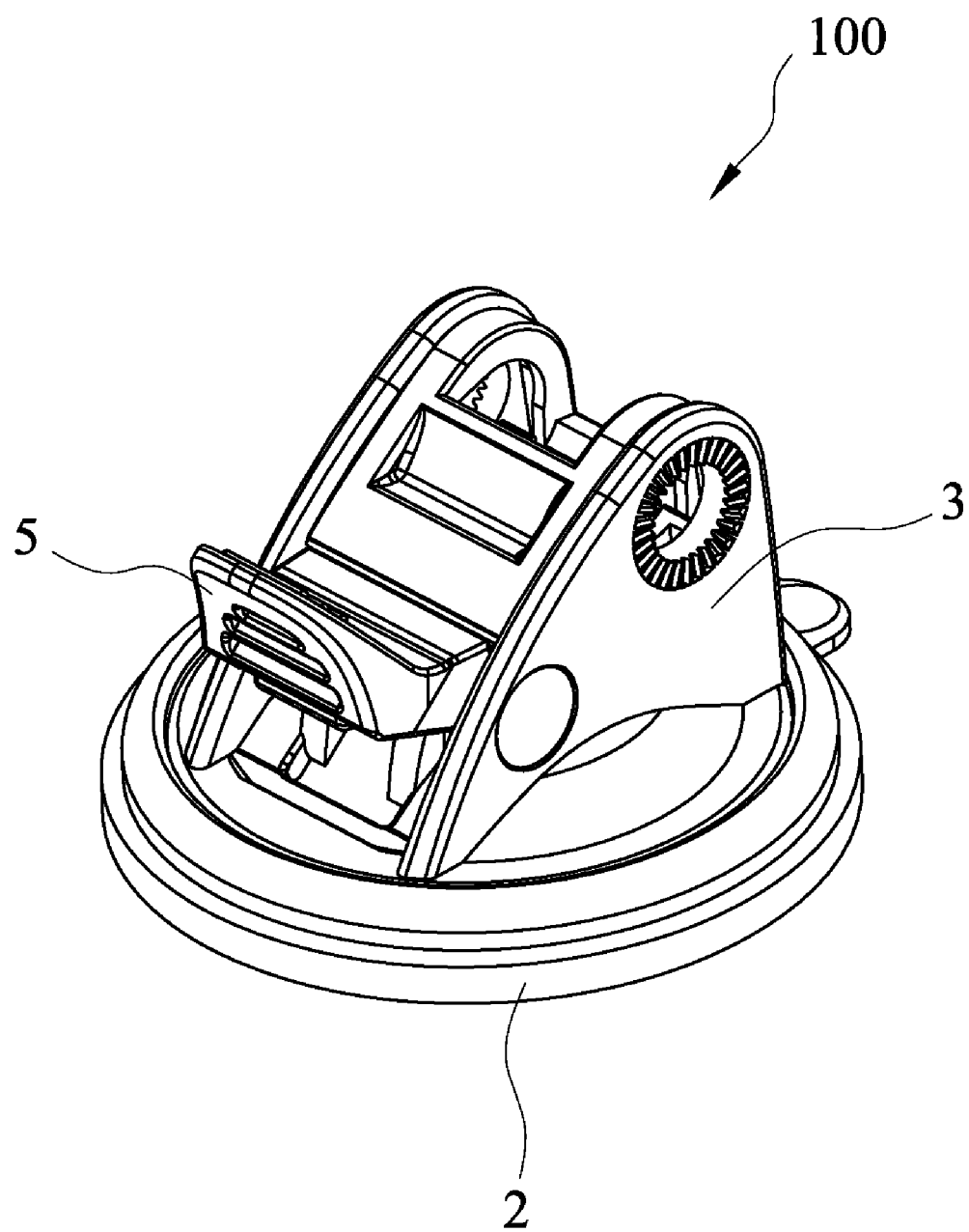
FIG. 1 shows a schematic view of the present invention.
Figure 2:
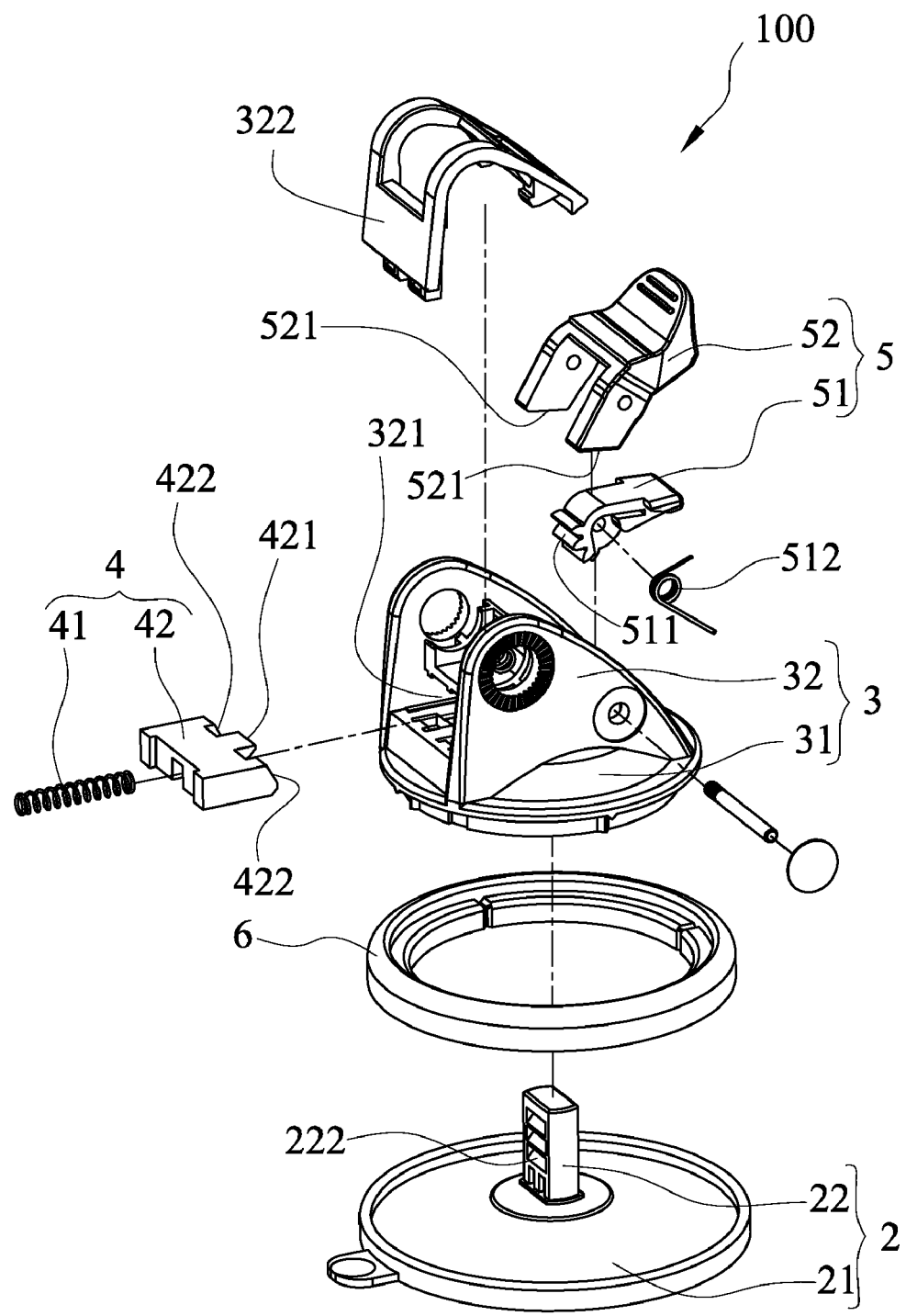
FIG. 2 shows a dissected view of the present invention.

FIG. 1 and FIG. 2 show a schematic view and a dissected view of a suction apparatus of the present invention, respectively. Suction apparatus 100 includes a suction disc unit 2, a shell base unit 3, a push obstruct unit 4 and a flip unit 5. Shell base unit 3 is located on top of suction disc unit 2. Push obstruct unit 4 and flip unit 5 are located inside shell base unit 3. When flip unit 5 is flipped downwards, central area of suction disc unit 2 is dragged up and push obstruct unit 4 temporarily fastens the position of flip unit 5 so that suction disc unit 2 can attach to a surface via suction force. When flip element is flipped upwards, the obstructing condition of push obstruct unit 4 is released so that suction disc unit 2 restores to normal position. The present invention achieves the attachment or the release of suction disc unit 2 by flipping flip element unit 5 towards different directions.

Figure 3:
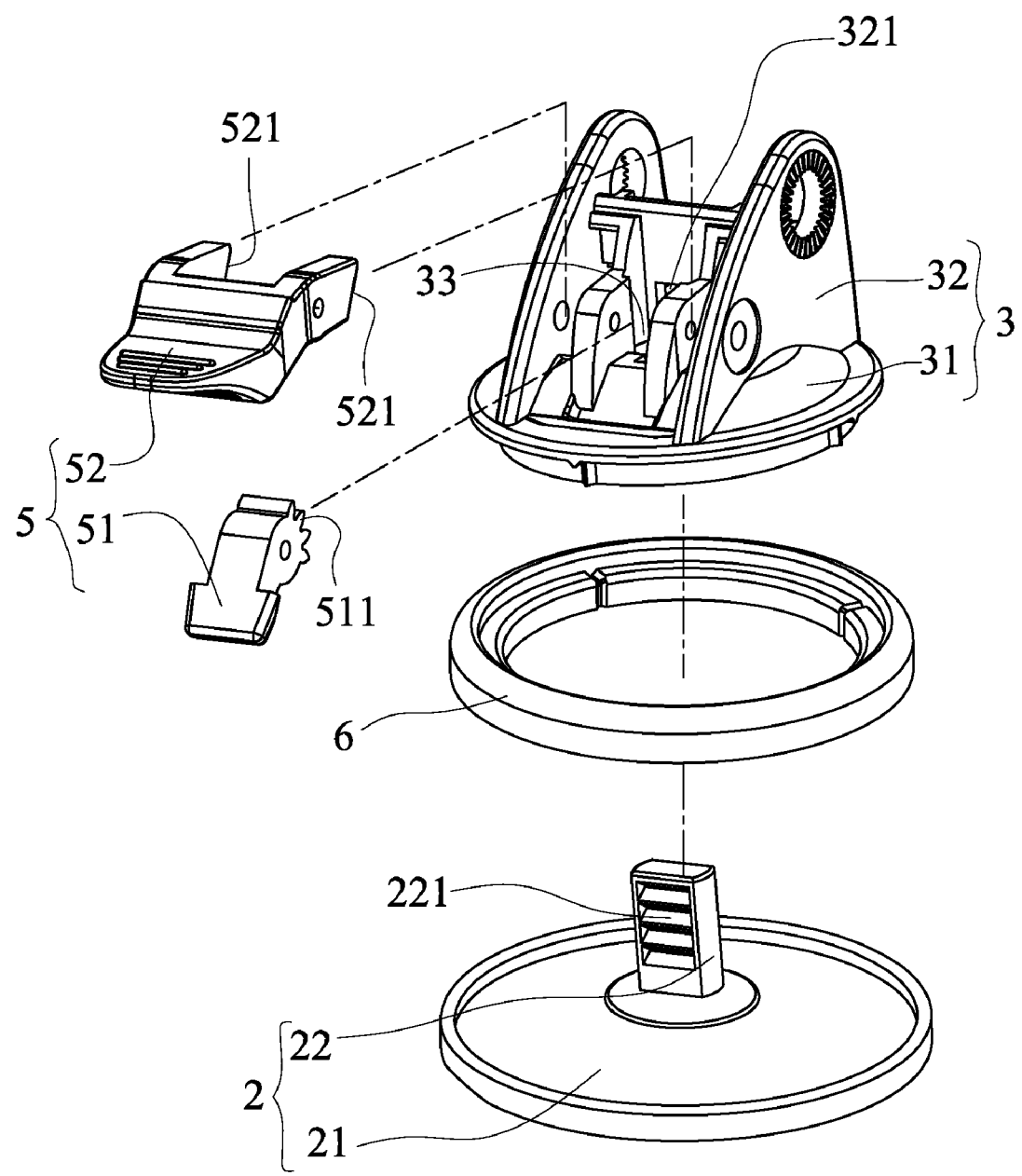
FIG. 3 shows a three-dimensional view of partial components of the present invention.

The following describes the details of each component. As shown in FIG. 2 and FIG. 3, suction disc unit 2 includes a suction disc 21 and a traction element 22. The bottom of suction disc 21 is a flat surface, made of a soft material. Traction element 22 is shaped as a long rectangular column, with bottom connected to the central area of the top surface of suction disc 21. The vertical surface of traction element 21 forms a first teeth surface 221 and a second teeth surface 222. First teeth surface 221 and second teeth surface 222 are located on the opposite vertical surfaces of traction element 22.

Shell base unit 3 includes a disc body 31 and a support base 32. Disc body 31 is shaped as a round disc with arc convex. The top surface of disc body 31 forms a support base 32. Support base 32 is a three dimensional structure to accommodate push obstruct unit 4 and flip unit 5. In addition, the inside of support base 32 forms a guide channel 33 through disc body 31. Guide channel 33 is to provide traction element 22 to partially extend into support base 32. The inside of support base 32 includes a plurality of wall plates to form a plurality of spaces to accommodate different components. For example, with guide channel 33 as center, one side of support base 32 is the space for housing push obstruct unit 4 and the other side is the coupling place for flip unit 5. The inside of support base 32 forms a first space 321, connected to guide channel 33. First space 321 is to house push obstruct unit 4. An outer cover 322 can partially seal first space 321 so that push obstruct unit 4 can only move inside first space 321 in lateral direction and for a short distance.

When suction disc unit 2 sucks to attach, the circumference of the bottom surface of disc body 31 must press against the top surface of suction disc 21 close to the circumference so that a near vacuum can be achieved at the central area of suction unit 2. The basic model usually only includes disc body 31 and suction disc 21. But the suction apparatus of the present invention includes a press obstruct unit 6. Press obstruct unit 6 is of a ring shape and is place between the top surface of suction disc 21 and the circumferential edge of the bottom surface of disc body 31.

Flip unit 5 is coupled inside support base 32, includes a coaxial link element 51 and a flip element 52. The edge outer wall of one end of link element 51 forms a teeth part 511. When assembled, teeth part 511 is meshed with first teeth surface 221 of traction element 22. The teeth shape of first teeth surface 221 is the same as the teeth on the common rack. Flip element 52 is shaped as an upside-down U. When assembled, the position to be flipped by external force is located above link element 51. The open space of the U-shaped flip element 52, i.e., the central part, is where teeth part 511 of link element 51 is located. As flip element 52 and link element 51 are coaxial, when flip element 52 is pressed downwards, link element 51 is also pressed downwards. However, when flip element 52 is flipped upwards, link element 51 moves alone. The two ends of the upside-down U of flip element 52 have slanted flip surfaces 521.

Push obstruct unit 4 includes a resilient element 41 and a push obstruct element 42, with both confined inside first space 321 of support base 32. Resilient element 41 is a spring, located between outer cover 322 of support base 32 and push obstruct element 42 to keep push obstruct element 42 stay in contact with traction element 22 in normal condition. The sides of the surface of push obstruct element 42 facing traction element 22 form a protruding tooth 421 and two protruding blocks 422. Second teeth surface 222 of traction element 22 is unidirectional ratchet. The shape of protruding tooth 421 matches second teeth surface 222 so that when protruding tooth 421 meshes with second teeth surface 222, traction element 22 can only move upwards. The location and the shape of protruding blocks match flip surface 521 of flip element 51.

Figure 4:
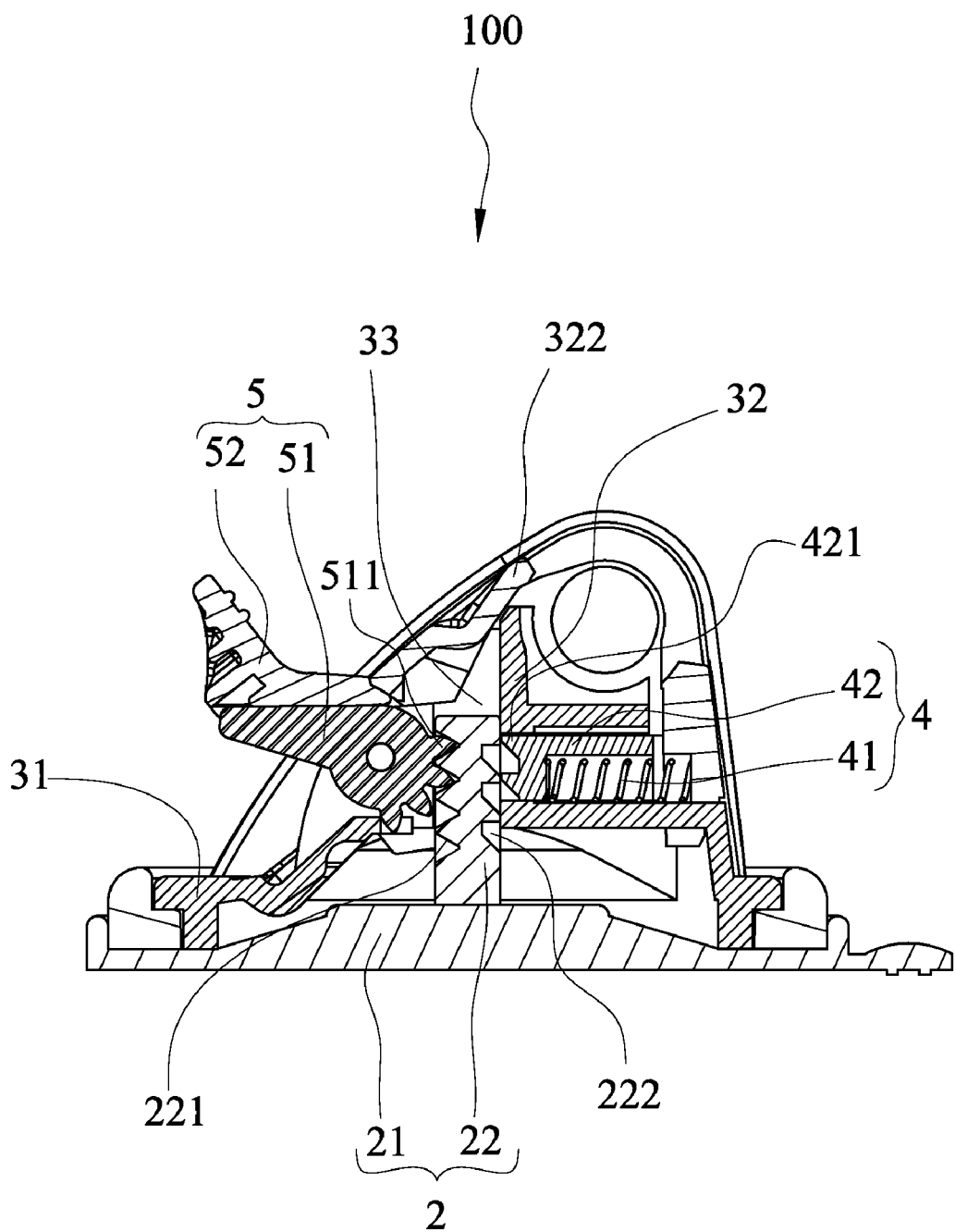
FIG. 4 shows a cross-section view (I) of the present invention.

As shown in FIG. 4, when assembled, traction element 22 of suction disc unit 2 extends into support base 32 of shell base unit 3 via guide channel 33. Flip unit 5, coupled to support base 32, uses teeth part 511 of link element 5 to mesh with first teeth surface 221 of traction element 22. Push obstruct unit 4 uses protruding tooth 421 of push obstruct element 42 to contact second teeth surface 222 of traction element 22. Because FIG. 4 shows the condition prior to operation, the disengagement of protruding tooth 421 and second teeth surface 222 does not affect the overall operation.

Figure 5:
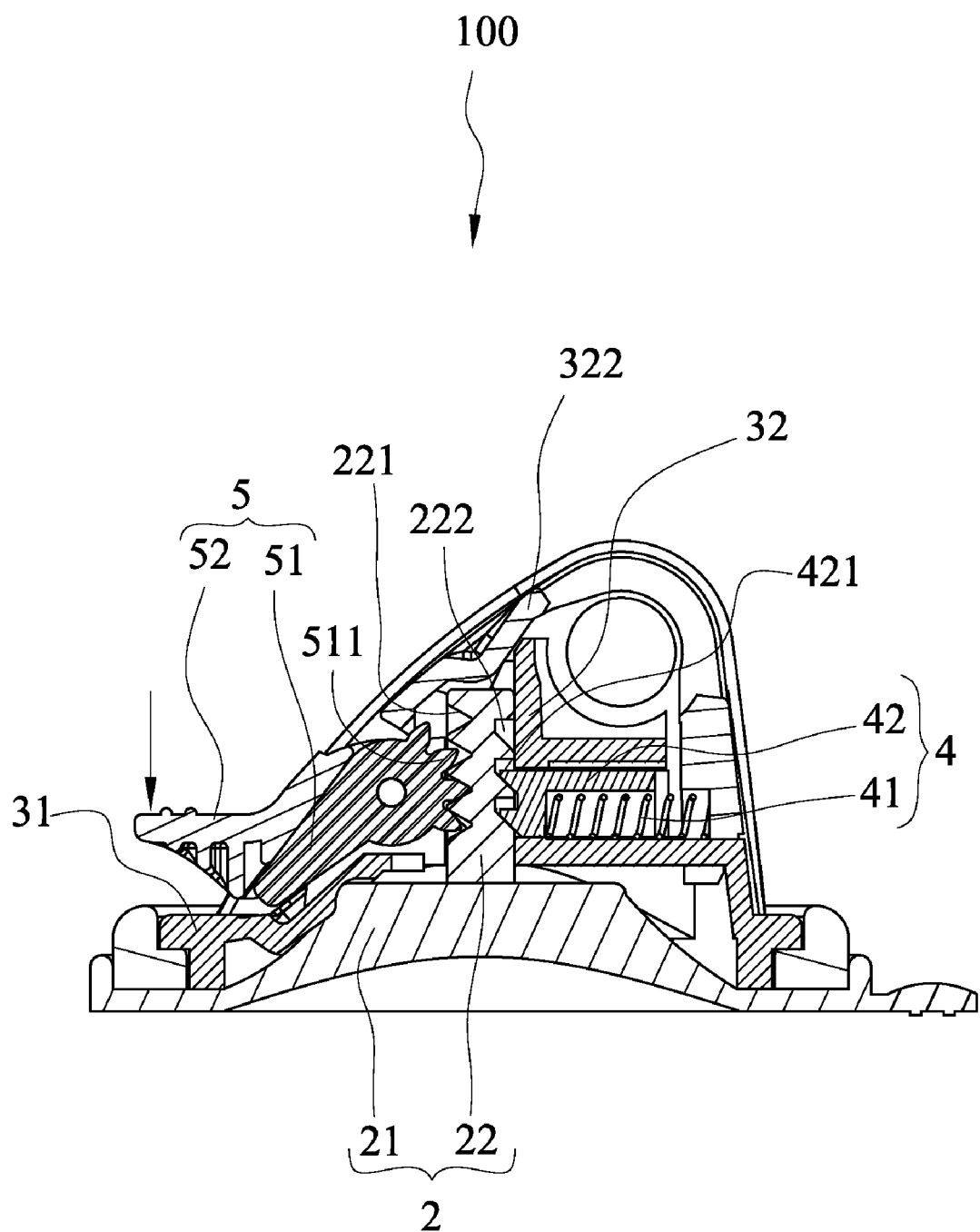
FIG. 5 shows a cross-section view (II) of the present invention.

As shown in FIG. 5, when flip element 52 is flipped downwards, the pressure also exerts on link element 51 to make link element 51 rotate. Because teeth part 511 is meshed with first teeth surface 221, traction element moves upwards and drags central area of suction disc 21 up to form a vacuum-like suction effect. Because second teeth surface 222 is meshed with protruding tooth 421 of push obstruct element 42, traction element 22 can only move upwards but not downwards during the flipping process. When the external force disappears, push obstruct unit 4 can maintain the final position of traction element 22 so that suction disc 21 will maintain good suction effect.

Figure 6:
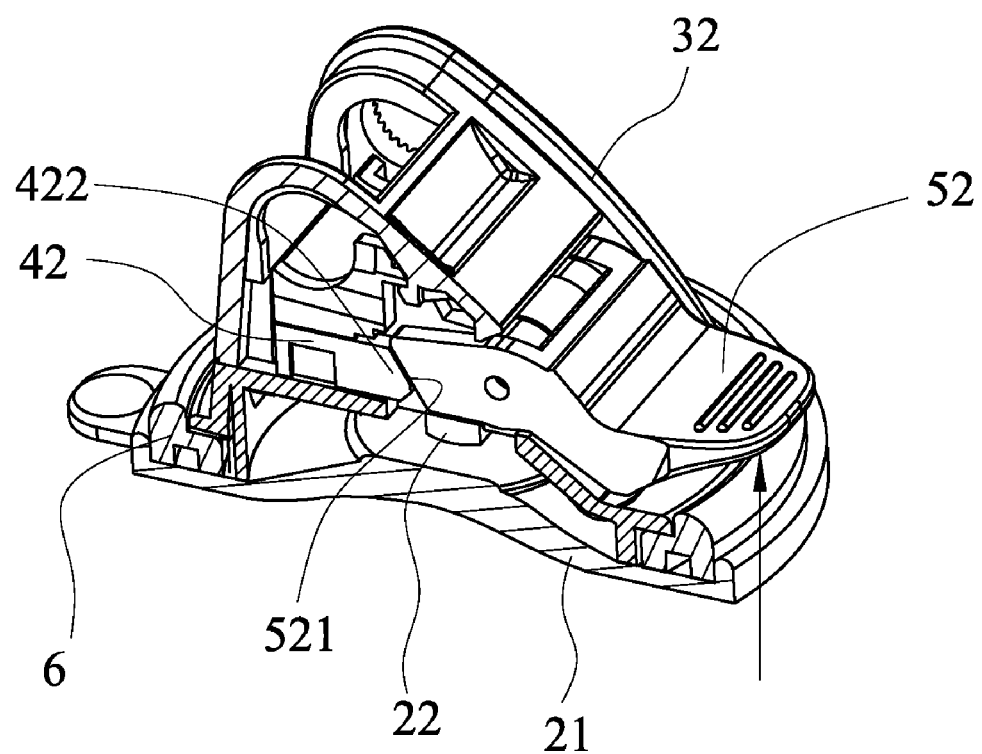
FIG. 6 shows a three-dimensional partial cross-sectional view of the present invention.

FIG. 6 shows the state of flip element 52 after flipped downwards. The partial shell of support base 32 is removed from FIG. 6 to expose the structural relation between flip element 52 and push obstruct element 42. As aforementioned, protruding tooth 421 of push obstruct element 42 is meshed with second teeth surface 222 of traction element 22. Flip surface 521 of flip element 52 and protruding blocks 422 of push obstruct element 42 are facing each other. When flip element 52 is flipped upwards, flip surface 521 moves in rotation to push protruding blocks 422 so that the entire push obstruct element 42 retracts. When protruding teeth 42 releases from the mesh with second teeth surface 222, suction disc 21 can return to original position. As shown in FIG. 2, a twist spring 512 can be placed at the axis of link element 51 so that when protruding tooth 422 and second teeth surface 222 are unmeshed, the restoration force of twist spring 512 will make link element 51 to drag down traction element 22.

Figure 7:
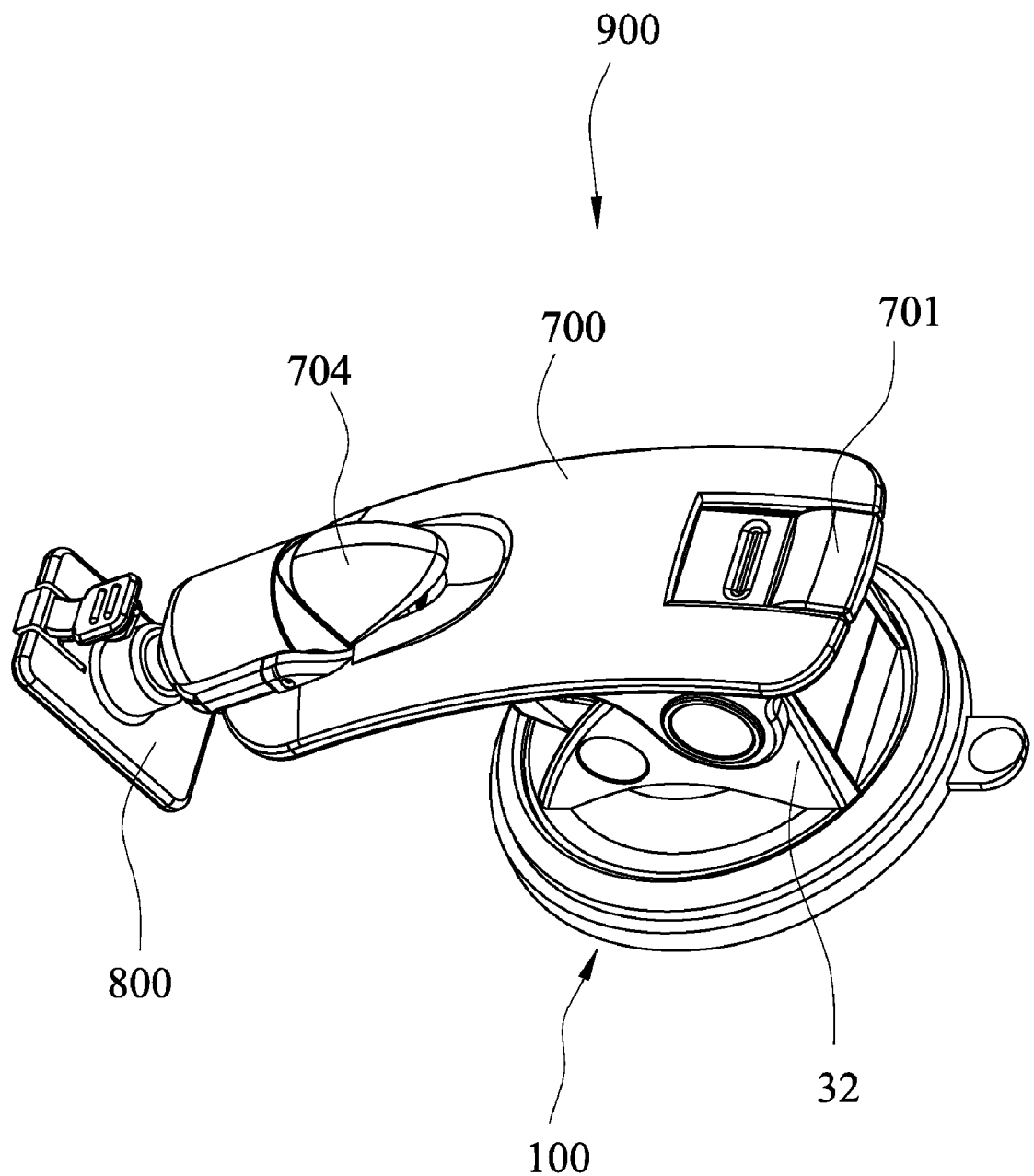
FIG. 7 shows a three-dimensional view of the support connection device based on the suction apparatus of the present invention.
Figure 8:
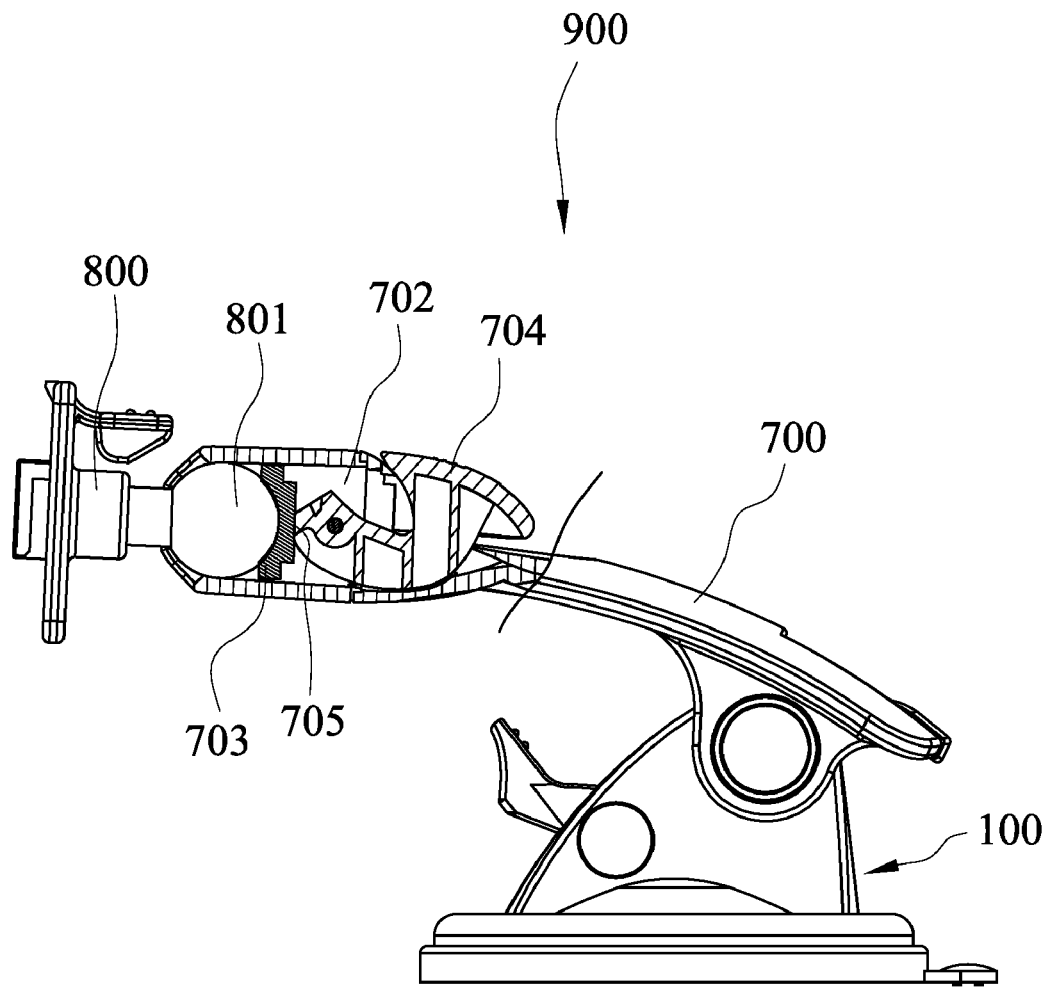
FIG. 8 shows a partial cross-section view (I) of the connection arm and buckle set element of the present invention.

FIG. 7 shows a schematic view of a suction disc supported connection device based on the suction apparatus 100 of the present invention. The suction apparatus of the present invention can be applied to various products, and is not limited to the exemplary embodiments. Suction disc supported connection device 900 includes a suction apparatus 100, a connection arm 700 and a buckle set element 800. Connection arm 700 is coupled to support base 32 of suction apparatus 100, and can rotate up to 180°. Button 701 is a release button. When button 701 is flipped upwards, connection arm 700 can be adjusted for various angles, as shown in FIG. 8. When button 701 is flipped downwards, the relative position between connection arm 700 and suction apparatus 100 is fastened. Buckle set element 800 is connected to the other end of connection arm 700 in a ball-socket joint manner so that buckle set element 800 can rotate for angle or directional adjustment. Buckle set element 800 provides connection to electronic device or other objects.

Figure 9:
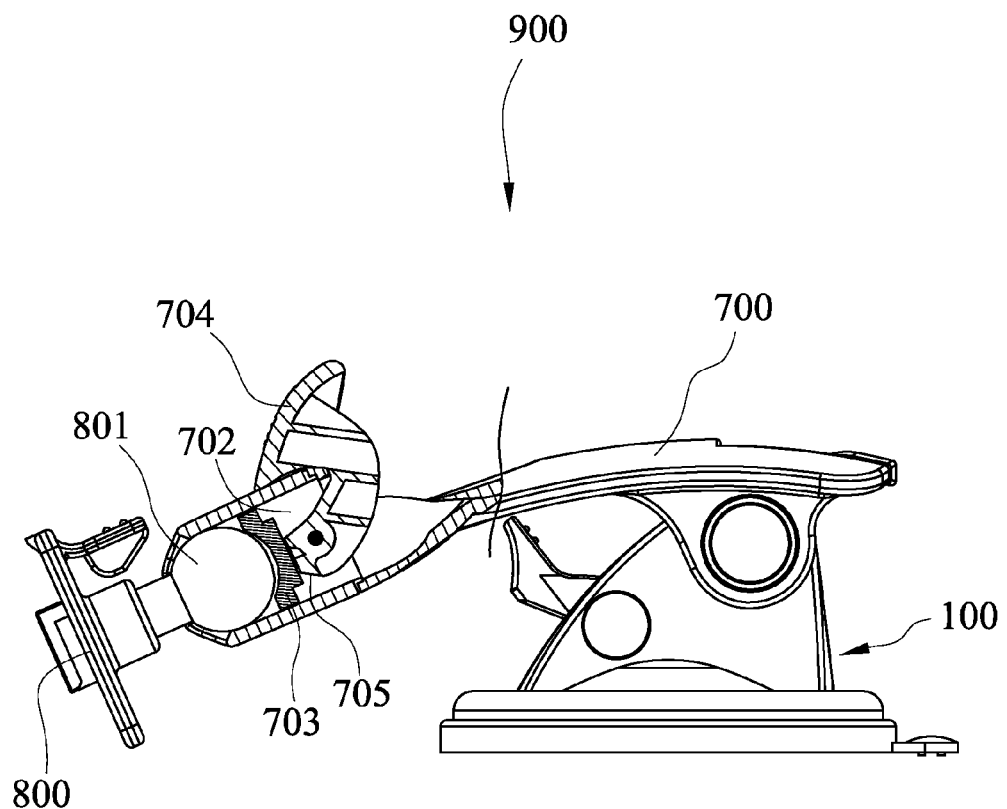
FIG. 9 shows a partial cross-section view (II) of the connection arm and buckle set element of the present invention, with buckle set element for angle adjustment.

FIG. 8 shows a cross-sectional schematic view of the connection structure between buckle set element 800 and connection arm 700. Buckle set element 800 uses a spherical shape joint 801 located inside a housing space 702 connected to connection arm 700. Housing space 702 further includes a fixing block 703. Fixing block 703 can only move for a short distance along the axial direction. Connection arm 700 is coupled to a trigger press element 704 near housing space 702. One end of trigger press element 704 is exposed outside of connection arm 700 and the other extends into housing space 702 Trigger press element 704 forms a push surface 705 on the end inside housing space 702. Push surface 705 contacts fixing block 703. A shown in FIG. 9, when trigger press element 704 is flipped open, fixing block 703 is not tightly in contact with spherical joint 801 of buckle set element 800 and buckle set element 800 can use spherical joint 801 to rotate inside housing space 702 for angle and directional adjustment. When trigger press element 704 is pressed down, as shown in FIG. 8, push surface 705 presses tightly against fixing block 703 and fixing block 703 presses tightly against spherical joint 801 so that spherical joint 801 cannot rotate inside housing space 702. In this manner, the relative position between connection arm 700 and buckle set element 800 is fastened.

In summary, the suction apparatus of the present invention is applicable to a wide range of products. The suction apparatus utilizes rack for linked movement, and can effectively control and adjust the suction force for attachment. The enhanced structure of the present invention allows to attach or to release the suction apparatus by flipping a single element in different directions to provide further convenience.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An enhanced structure for suction apparatus, comprising:
a suction disc unit, a shell base unit, a push obstruct unit, and a flip unit; said suction disc unit comprising a suction disc and traction element; said traction element being connected to top surface of said suction disc; said shell base unit comprising a disc body and a support base, said support base being located on top surface of said disc body; inside of said support base forming a guide channel through said disc body; said traction element being partially guided by said guide channel to enter said support base; with features of:
vertical surface of said traction element of said suction disc unit forming a first teeth surface and a second teeth surface; said push obstruct unit being located inside said support base; in normal condition, said push obstruct unit beings meshed with said second teeth surface of said traction element, when in mesh state, said traction element being able to move in one direction;
said flip unit being coupled to said shell base, and being made up of a link element and a flip element coaxially; said link element forming a teeth part on surface facing edge outer wall of said traction element; said teeth part being meshed with said first teeth surface; said flip element being located above said link element, and able to operate said linked movement with said push obstruct unit properly;
when the flip element being pressed downwards, said link element rotating along because said teeth part being meshed with said first teeth surface so that said traction element also moving in a linked manner; when said flip element being flipped upwards, said flip element pushing said press obstruct element to release mesh engagement between said press obstruct element and said second teeth surface.

2. The enhanced structure for suction apparatus as claimed in claim 1, wherein said push obstruct unit comprises a resilient element and a push obstruct element, both are confined inside a first space of said support base, said first space is connected to said guide channel, said resilient element is a spring, located between an outer cover of said support base and said push obstruct element to keep said push obstruct element stay in contact with said traction element in normal condition.

3. The enhanced structure for suction apparatus as claimed in claim 1, wherein said first teeth surface and said second teeth surface are located on opposite vertical surfaces of said traction element, said push obstruct unit and said flip unit are located on both sides of said guide channel inside of said support base, said flip unit is meshed with a first teeth surface of said traction element extending along said guide channel and said push obstruct unit is meshed with said second teeth surface.

4. The enhanced structure for suction apparatus as claimed in claim 3, wherein side of surface of said push obstruct element facing said traction element 22 forms a protruding tooth, and said second teeth surface of said traction element is unidirectional ratchet; shape of said protruding tooth matches said second teeth surface so that when said protruding tooth meshes with said second teeth surface, said traction element can only move upwards.

5. The enhanced structure for suction apparatus as claimed in claim 3, wherein side of surface of said push obstruct element facing said traction element forms a plurality of protruding blocks, said protruding blocks are not in contact with said traction element, and are moved by said flip unit.

6. The enhanced structure for suction apparatus as claimed in claim 1, wherein said flip unit comprises coaxially a link element and a flip element, said flip element is shaped as an upside-down U, position to be flipped by external force is located above said link element, open space of said U-shaped flip element is where teeth part of said link element is located, two ends of said upside-down U of said flip element have slanted flip surfaces; when said flip element is flipped upwards, said flip surface is responsible for contacting said push obstruct unit and pushing said push obstruct unit to move a short distance to release said push obstruct unit and said second teeth surface from mesh state.

7. The enhanced structure for suction apparatus as claimed in claim 1, wherein said suction apparatus is connected to a connection arm, and said connection arm is further connected to a buckle set element, said suction apparatus, said connection arm and said buckle set element form a suction disc-supported connection device.

8. The enhanced structure for suction apparatus as claimed in claim 7, wherein said buckle set element uses a spherical joint housed inside a housing space connected to said connection arm, said housing space further comprises a fixing block, said fixing block can only move inside said housing space in lateral direction and for a short distance, said connection arm is coupled to a trigger press element near said housing space, one end of said trigger press element is exposed outside of said housing space and the other end extends into said housing space, said end of said trigger press element inside said housing space forms a push surface, said push surface contacts said fixing block at proper time so that said fixing block and said spherical joint of said buckle set element tightly contact with each other at proper time.

* * * * *